(No Model.) 7 Sheets—Sheet 1.

L. C. CROWELL.
Sheet Delivery Apparatus for Printing Machines.

No. 233,993. Patented Nov. 2, 1880.

Attest;
Geo. H. Graham
T. H. Palmer

Inventor,
Luther C. Crowell,
by Munson & Philipp
Attys.

(No Model.) 7 Sheets—Sheet 3.
L. C. CROWELL.
Sheet Delivery Apparatus for Printing Machines.
No. 233,993. Patented Nov. 2, 1880.

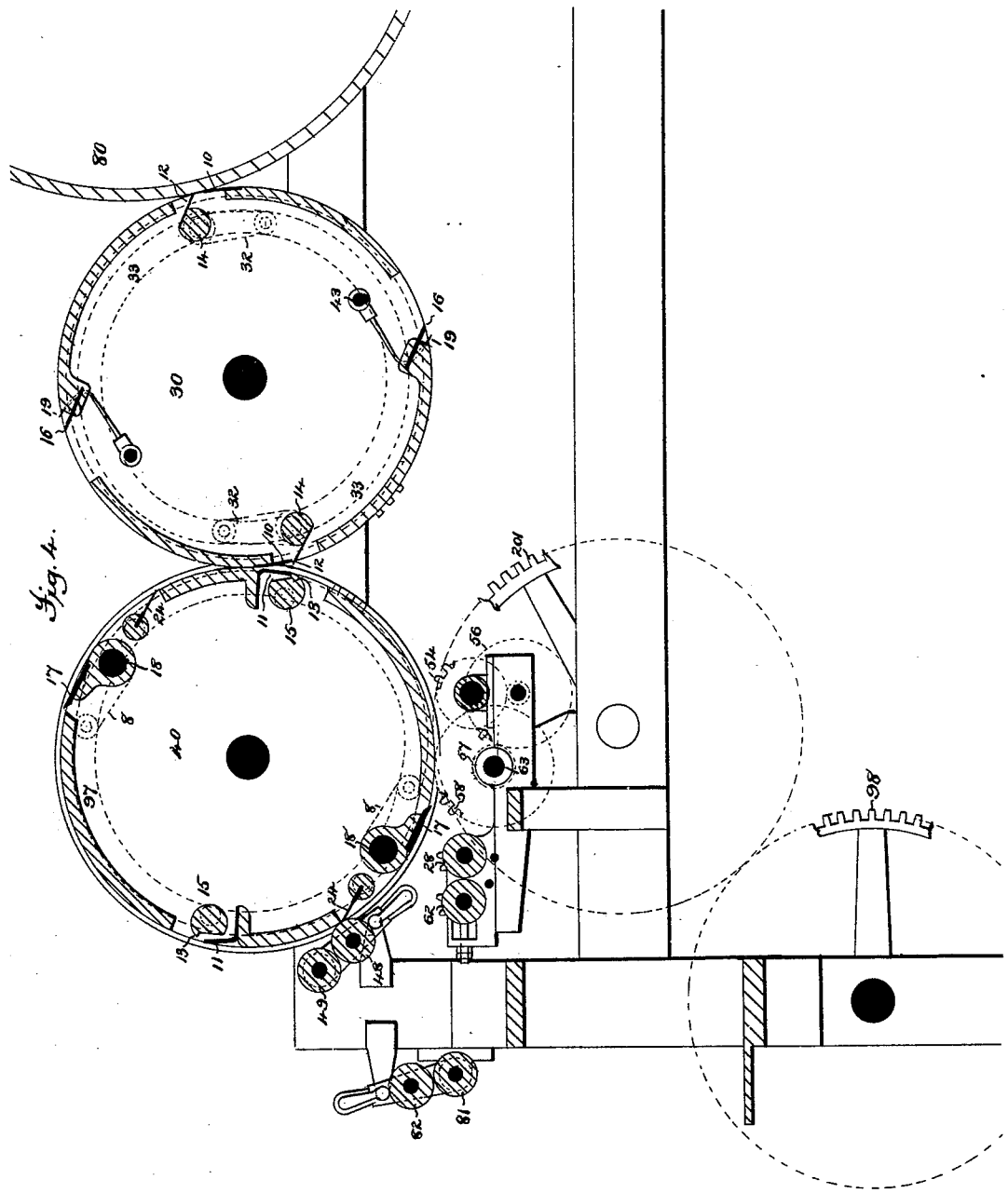

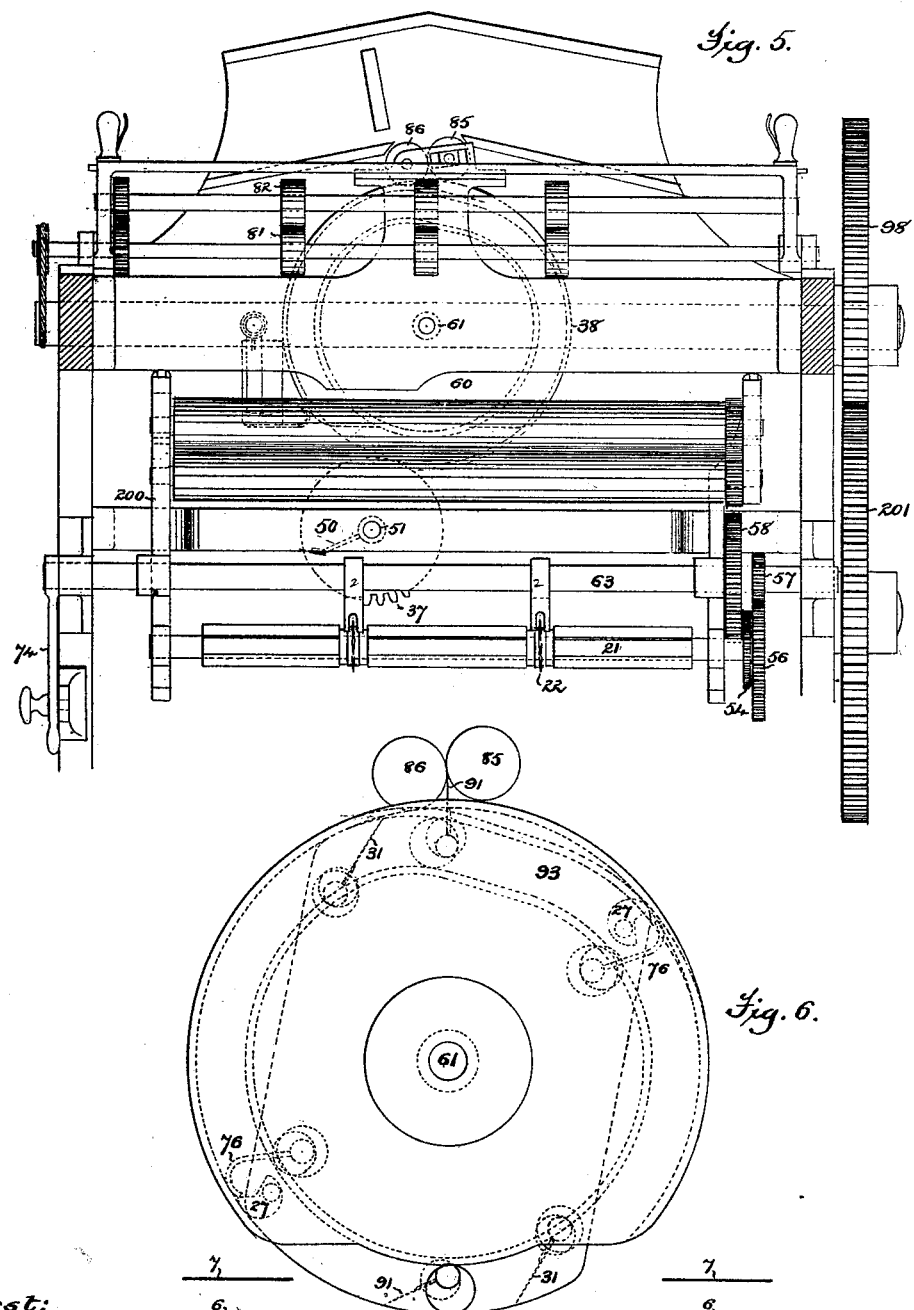

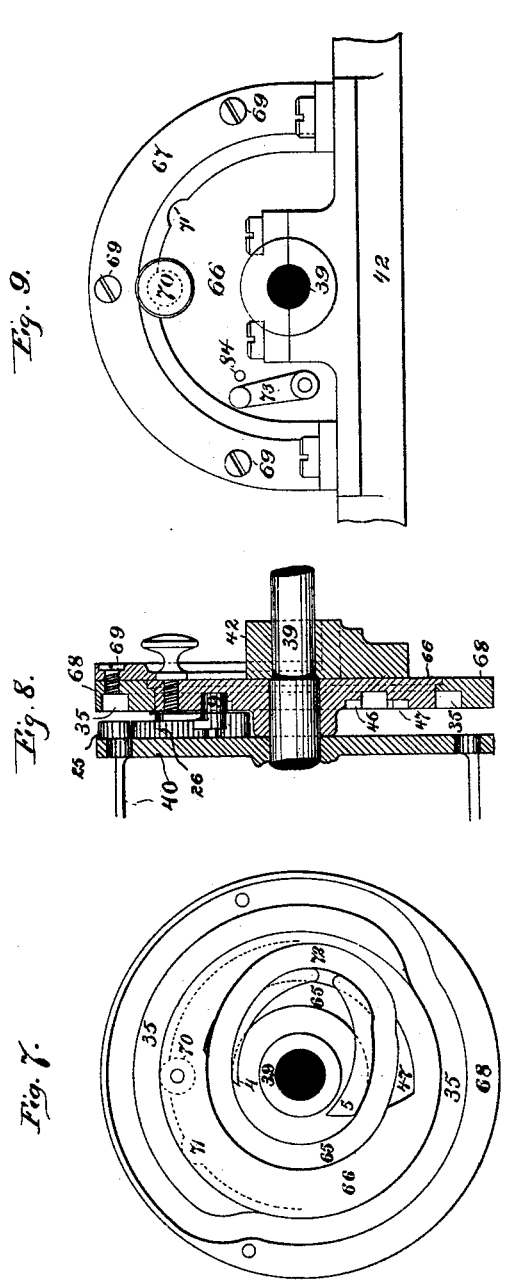

(No Model.) 7 Sheets—Sheet 7.
L. C. CROWELL.
Sheet Delivery Apparatus for Printing Machines.
No. 233,993. Patented Nov. 2, 1880.
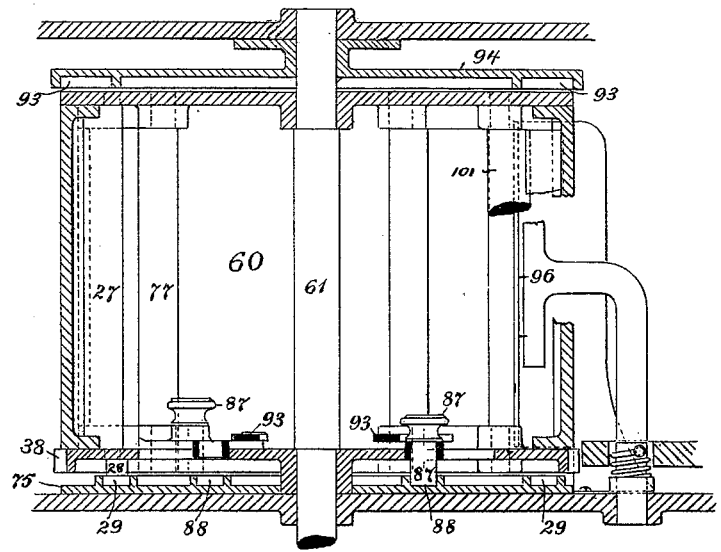
Fig. 13.
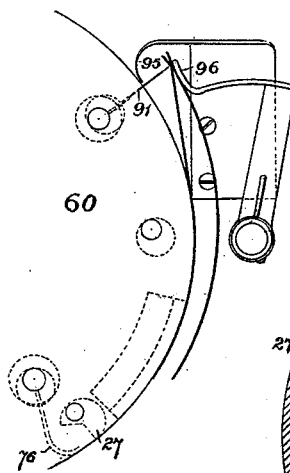
Fig. 15.
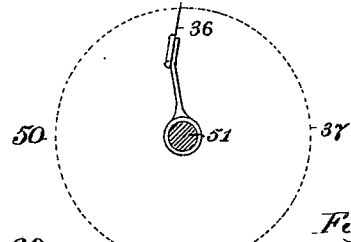
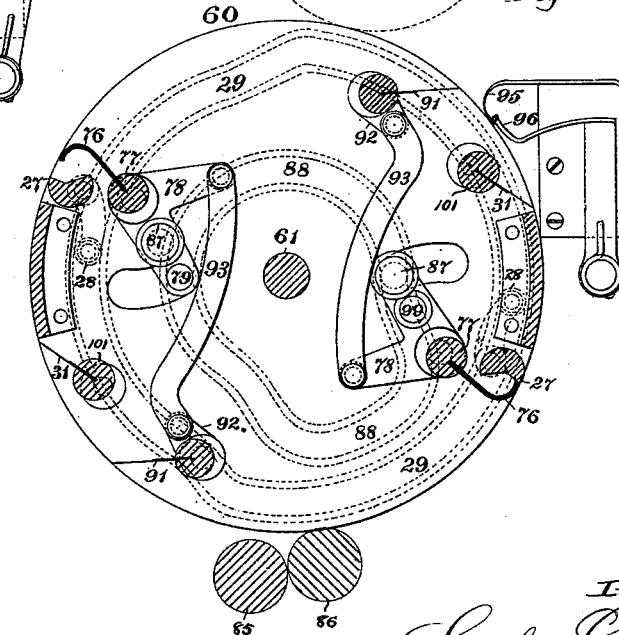
Fig. 14.
Attest:
Geo. H. Graham
T. H. Palmer
Inventor,
Luther C. Crowell,
by Munson & Philipp
Attys.
N. PETERS, PHOTO-LITHOGRAPHER, WASHINGTON, D. C.

UNITED STATES PATENT OFFICE.

LUTHER C. CROWELL, OF BROOKLYN, NEW YORK.

SHEET-DELIVERY APPARATUS FOR PRINTING-MACHINES.

SPECIFICATION forming part of Letters Patent No. 233,993, dated November 2, 1880.

Application filed May 15, 1880. (No model.)

*To all whom it may concern:*

Be it known that I, LUTHER C. CROWELL, a citizen of the United States, residing in the city of Brooklyn, county of Kings, and State of New York, have invented certain new and useful Improvements in Sheet-Delivery Apparatus for Printing-Machines, fully described and represented in the following specification and the accompanying drawings, forming a part of the same.

Figure 1:
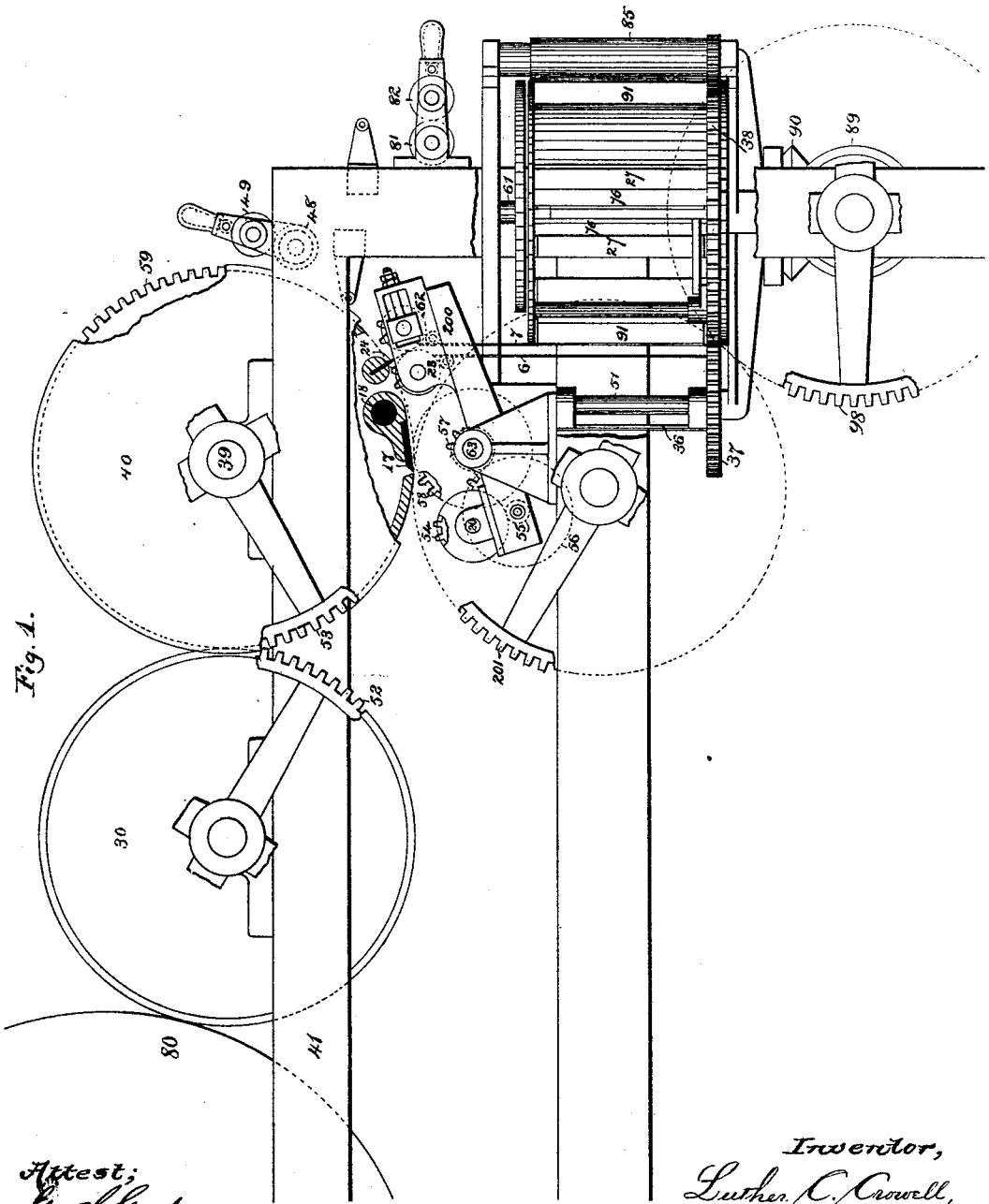
Figure 2:
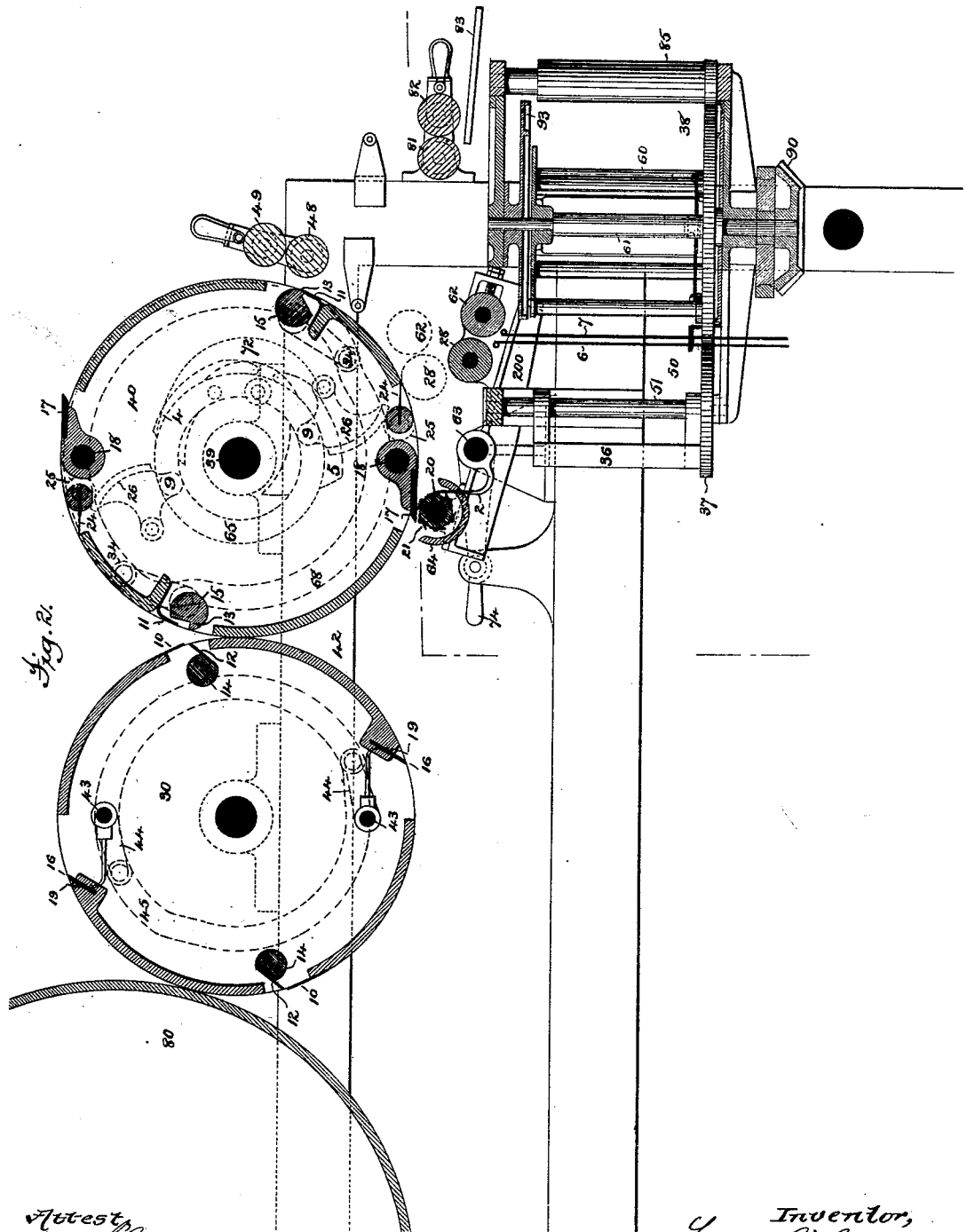
Figure 3:
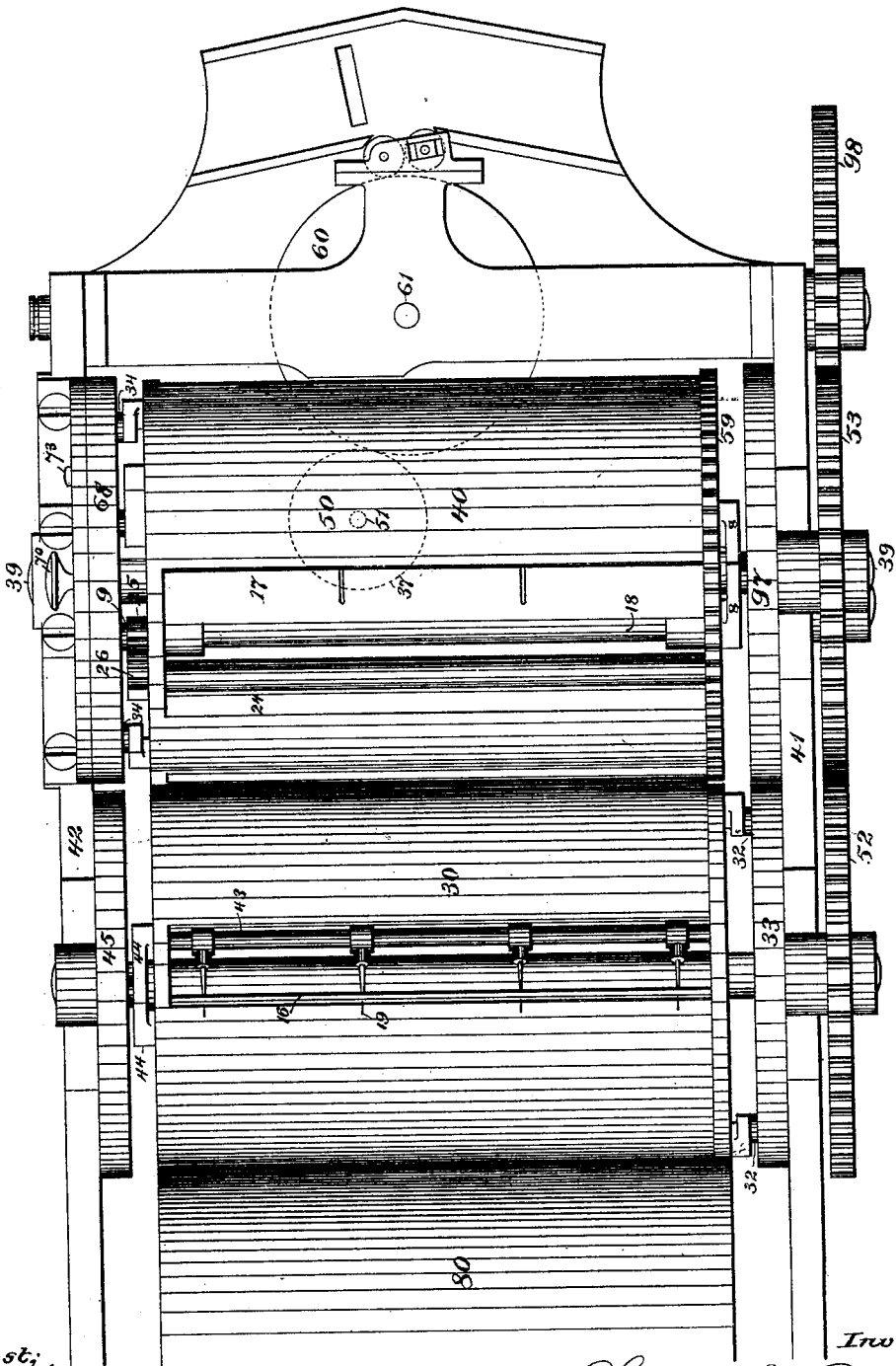

In said drawings, Figure 1 represents an elevation of the gear side of a machine containing the present improvements. Fig. 2 represents a longitudinal sectional elevation looking toward the opposite side of the machine. Fig. 3 represents a plan view. Fig. 4 represents a longitudinal sectional elevation looking toward the gear side of the machine. Fig. 5 represents a view of the machine taken with the upper works omitted, so as to show a plan or top view of the vertical folding devices. Fig. 6 represents a plan view of the cam for operating the folding-blades for the fourth fold. Fig. 7 represents an inside view of the cams for operating the cutting-blades 17 and the folding-blades for producing the second fold, Fig. 8 showing a vertical section of the same, and Fig. 9 an outside elevation thereof and the supporting arched frame. Fig. 10 represents the sheet-controlling device by an elevation, Fig. 11 being a cross-section showing the plates, and Fig. 12 a cross-section showing the pins and stripper. Fig. 13 represents a sectional elevation of the cross-folding mechanism, and Fig. 14 a horizontal section thereof. Fig. 15 represents the delivery apparatus for the third fold.

This invention relates to the construction of delivery apparatus for printing-machines in which webs or long lengths of paper are drawn from a roll and printed upon one or both sides. The inventions or improvements are comprised in a rotating cutting and folding mechanism whereby a web or long length of paper or similar material is cut into short lengths or sheets, which are folded and delivered as follows: A, with one transverse fold; B, with two transverse folds; C, with one transverse fold and one cross-fold; D, with two transverse folds and two cross-folds. Besides the mechanisms for accomplishing the foregoing, the invention includes various combinations of parts, various devices for controlling the movement and delivery of the sheets, and other details too fully hereinafter set forth to need further preliminary description.

Proceeding, now, to a detailed description of a practical embodiment of the invention, it may be said that the main elements of the machine illustrated are two rotating cylinders or carriers, 30 40, that are mounted horizontally in bearings in side frames, 41 42, and of two rotating carriers, 50 60, that are mounted vertically in suitable bearings in cross-frames that unite said side frames together. (See dotted lines, Fig. 3.) The carriers 50 60 are composed of shafts 51 61, from which project the parts necessary to support the coacting folding devices, and it will hence be understood that the carriers 30 40 may be similarly constructed, and that the carriers 50 60 may be constructed as are the carriers 30 40. In connection with this delivery apparatus the last impression-cylinder, 80, of an ordinary web-press which simply prints but does not cut is represented, from which it will be understood that the printed web is led, without being severed, directly to the horizontal cylinders 30 40. It being understood that the web from the printing-machine may be conducted some distance before it enters this delivery apparatus, and that the folding mechanisms of said apparatus are placed at right angles to each other, so that the folding devices that perform the cross-folds may be horizontally arranged and yet perform the operation of cross-folding, a description of the various parts will be proceeded with.

The cylinders 30 and 40 are geared together by toothed wheels 52 53, so as to run in unison, from one of which wheels they may be driven by gearing connected with the printing-press. These cylinders are provided with duplicate mechanisms, so that at one revolution thereof two sheets will be manipulated. In describing these mechanisms only one set will be referred to, it being understood that the second set, which are placed in opposite positions to the first set, and which are lettered with like characters, operate in precisely the same way.

The means of accomplishing a transverse fold in the sheet are as follows: The cylinder 30 has its periphery provided at a proper point with a plate, 10, and the cylinder 40 is provided with a similar plate, 11, in a corresponding position, said plates preferably being thin and elastic, and operating, when the cylinders revolve, to press these sheets between them and hold the same. Below the plate 10 the cylinder 30 is provided with a thin presser-bar, 12, the edge of which lies in an opening in the cylinder and projects slightly beyond the peripheral line thereof. This presser-bar 12 is mounted upon a shaft, 14, that turns in the heads of the cylinder 30, and which is provided at one end with a rock-arm, the stud or roller 32 of which runs in a slotted cam, 33, which cam is adjusted so as to rock the shaft 14 and impart a slight vibratory movement to said presser-bar 12. The cylinder 40 is provided at a suitable point below the plate 11 with a presser-jaw, 13, that is hung upon a shaft, 15, which shaft is journaled in the heads of the cylinder 40, and provided at one end with a rock-arm, the stud or roller 34 upon which runs in a slotted cam, 68, that is properly secured to the arched side frame, 67, by a screw, 69, the groove 35 of which cam imparts a slight vibratory movement to said presser-jaw 13. The cylinder 30 is also provided with a fixed cutting-blade, 16, which co-operates with a cutting-blade, 17, that is mounted upon a shaft, 18, so as to project slightly beyond the periphery of cylinder 40. The cylinder 30 also carries impaling-pins 19, that project from a rock-shaft, 43, that is vibrated at the proper times by means of its rock-arm 44 by a cam, 45, and these pins 19 are projected by the cam so as to protrude behind the cutting-blade 16 and impale the paper to secure the leading end of the web, when, by the cutting action of the blades 16 17, the sheet severed thereby is detached from the web. The leading end of the sheet secured by these pins will be held to the surface of the cylinder 30, and travel around with it until the folding devices come into action upon the folding-line of the paper, and secure the same, when, by the action of the cam 45, said pins will be withdrawn and the leading end of the sheet released. As the body of the sheet is thus carried between the folding devices of the cylinders 30 and 40 the plates 10 and 11 are caused to press toward each other, nip the sheet, and hold it secure. The presser-bar 12 and jaw 13 will at that moment, being opposite each other, have a slight rearward vibration imparted to them by the action of their cams 33 and 68, and thus seizing the sheet between them carry it slightly rearward, and cause a loop or bight of paper to be bent into the space between the jaw 13 and the end of the plate 11, where it will be held. As the cylinders further revolve, the bar 12 will be moved away from the jaw 13, and the latter, with the plate 11, will carry the bight or fold of paper onward with the cylinder 40, thus drawing together the leading and rear ends of the sheet, (which will be severed from the web by the action of the cutters 16 17 as they or their companion set of cutters come into operation,) thereby completing the first transverse fold. When the cylinder 40 has so far rotated as to reach the proper delivery-point for the sheet, the forward vibration of the jaw 13 is accomplished by the groove 35 of cam 68, and the once-folded sheet is thus released. At any suitable point of the rotation of the cylinder 30 the forward vibration of the jaw 12 is accomplished to bring it into position to repeat the operation; but it is to be understood that the cam 33 is capable of adjustment, whereby it may throw the presser-bar 12 so that it will protrude beyond the periphery of the cylinder and there stand in a position to act as a tucking-blade, which will force the paper lying over it into the space between the jaw 13 and plate 11, and then be moved in a contrary direction as said jaw 13 is vibrated to nip the bight of paper.

It may be here remarked that the pins 19 are not essential to the proper manipulation of the sheet, the leading end of which, when severed by the blades 17 16, especially when the same are serrated, will have a fibrous edge, the filaments of which, being carried over the blade 16, will temporarily hold the end of the paper there and prevent the air from entering beneath the same quickly enough to force the sheet off of the cylinder 30 before its folding-point is secured by the folding devices.

In the production of newspapers it is well known that a part of the edition is sent out to the news-agents in quantities of several hundreds, and in this case it is desirable to deliver the papers from the press in the best form for packing a large number compactly and expeditiously, and this is the folio form, which is accomplished by the single fold just described.

As this folding mechanism is designed to run at great speed, it will be apparent that the once-folded sheets will be dropped successively from the jaw 13 and plate 11, and that consequently the pile of such sheets will rapidly accumulate. Practically, it is found necessary to arrest the impetus given to these sheets by the rotary folding devices, and this is provided for in this apparatus by a sheet-controlling mechanism that consists of a small cylinder, 20, upon the surface of which lie a number of tangentially-arranged elastic plates 21, of metal, leather, or rubber, each of which plates will, when said cylinder 20 is in a proper position by its rotation, lie nearly parallel with the face of the cutter-blade 17 as it passes over said plate. This cylinder 20 is also provided at one or more points (preferably two) of its length with curved projecting pins 22, which protrude beyond the plates 21, and this cylinder 20 is rotated at a proper speed with relation to that of the carriers 30 40 by means of a toothed wheel, 54, and intermediates 55, 56, 57, and 58, that gear with the driving-wheel 59 on the shaft of the cylinder 40. This gearing is properly timed, so that the cylinder 20 makes one-third of a revolution to each revolution of the cylinder 40. Thus, as the cylinder 40 carries two sets of folding devices and the cylinder 20 carries six plates and sets of pins, it is obvious that a plate and set of pins will be brought into position to arrest each sheet folded.

The shaft 18 of the cutting-blade 17 is hung in the heads of the cylinder 40, and provided with a rock-arm, 8, that is actuated by a slotted cam, 97, fixed to the frame-work. The operation of these parts is such that when a once-folded sheet the doubled bight or folded edge of which is carried by by the jaw 13 and plate 11 is moved so far forward that its tail ends are brought between the blade 17 and the cylinder 20, a slight outward vibration of said blade 17 is accomplished by its cam 97, and thus presses the tail ends of said sheet against one of the plates, 21, carried by the shaft 20, said tail ends being thus momentarily nipped between the surface of the blade and that of one of the plates 21, whereby the onward movement of the sheet is arrested. This nipping of the tails of the sheets also causes them to be impaled by the pins 22, which protrude into slots in the blade 17. The cylinder 40 moves rapidly onward, carrying with it the cutting-blade 17 away from the tails of the sheets, while the cylinder 20 rotates slowly, its pins 22 holding the tail ends of the folded sheet, and thus holding it within their control and suspending its rapid onward movement, so that its leading or folded edge, which has been released by the jaw 13, may settle down or descend upon a suitable receiving-surface. The slow rotating movement of the cylinder 20 moves this sheet slowly onward a short distance and presents the next rearward plate, 21, and the next rearward pins, 22, in proper position to repeat this arresting operation in connection with the cutting-blade 17 as the succeeding folded sheet is brought into delivering position. Practically, the outward movement of the cutting-blade 17 takes place as it is approaching the cutting-point, at which time it has its greatest protrusion upon the cylinder, and it stands in this position until it co-operates with the plate 21 in arresting the sheets, and from this point its movement within the periphery of the cylinder takes place, so that it may not drag over the sheet which it has arrested, and which it leaves held by the pins, and tear the same off from the pins.

To prevent the tails of the sheets being carried around with the cylinder 20 strippers 2 are provided. These strippers project rigidly outward from a rod, 63, and lie along the side of or embrace each circular series of pins 21, and as these pins rotate and carry the tails of the sheets held by them downward, the strippers 2 force said tails off from the pins, and thus leave the sheets free. A guard, 64, partially encircles the cylinder 20 and the devices it carries, to prevent them from injury, and its forward end assists in stripping the sheets from the pins. By the operation of this sheet-controlling mechanism each sheet is slightly pressed forward on the preceding sheet, and thus the pile, as delivered, presents inclined front edges, which greatly facilitates the removal of a greater or lesser portion thereof by means of the attendants.

Another part of the edition of a newspaper is sent out to another class of news-agents, who deliver the same in bundles of small quantities. In this case it is desirable to deliver the papers from the press in the most convenient form for bundling, and this is done by imparting two parallel transverse folds. To adjust this machine to impart two parallel transverse folds to the sheets as it passes once through the same, the following devices are brought into operation: The cylinder 40 is provided at the proper points between the jaw 13 and plate 11 and the cutting-blade 17 with a vibrating folding-blade, 24. This blade is mounted upon a shaft that turns in the cylinder-heads, and which carries at one end a pinion, 25, Fig. 8, with which a rocking segment-rack, 26, meshes. This rack is pivoted to the cylinder-heads, and carries a friction stud or roller, 9, that travels in the grooves of a cam, 66. (See Figs. 7, 8, 9.) The cam 66, which imparts motion to the vibrating folding-blade, is constructed with a groove, 65, that provides a circular path of travel for the stud 9 of the rock-arm of the segment-rack 26, (see Fig. 7,) so that when said stud travels in the circular groove 65 the said blade 24 will not vibrate; and said cam has an extension or second groove, 72, which, united to the groove 35, provides said cam with an oblong path of travel for the said stud 9, by the action of which the segment-rack will be vibrated and impart a similar motion to the blade 24. The groove 65 is put into communication with the groove 72 by means of a head-switch 5, that is pivoted at its rear end to a short stud, upon the outside of which a lever, 73, is fixed. This head-switch may be vibrated from a top recess, 46, to a bottom recess, 47, formed in the cam-body, a suitable adjusting-hole, as 84, being provided in the back plate of the cam to secure said head-switch in place. A tail-switch, 4, completes the uniting of the grooves 65 and 72, and it is pivoted and vibrates in a manner similar to the switch 5, except that it is automatically moved into one position or the other by the action of the said stud in passing it, friction holding it up or down, as the cam may be. This cam 66 is hung on a shaft, 39, of the cylinder 40, and may be adjusted axially thereon bodily with its switches 4 5 by means of an adjusting locking-screw, 70, the flange of which enters into a recess, as 71, cut in the inner edge of the arched frame 67. Thus in either position of its axial adjustment its switch 5 may be adjusted to cause the vibration of the folder or suspend the same. When the folio form is being produced, or a single fold imparted to the sheet, the head-switch 5 is moved so that the oblong part of this cam is thrown out of action; consequently the stud or roller 9 of the segment 26 travels in a circular path, or in the groove 65, (see Fig. 2,) and the folding-blade is not vibrated. To bring this folding-blade into action to impart a second transverse fold to the sheets, the cam 66 is adjusted axially into the position shown in Fig. 7, and its head-switch is adjusted as there shown, so that the stud or roller will travel in the oblong path formed by the uniting of the grooves 65 and 72. The set of folding-rollers 48 49, which are arranged in a swinging frame, so as to be moved from the position shown in Fig. 2 to the position shown in Fig. 4, and are adjusted in the latter position, and another set of rollers, 81 82, also hung in a swinging frame, are swung up to the operative position shown in Fig. 4.

When the sheet once folded, as has been described, arrives at the point where it is released by the jaw 13, its head will have been carried between the roller 48 and the periphery of the cylinder 40, and will thus be carried onward in its circular path, and when the blade 24 arrives opposite the rollers 48 49, the stud 9 of the segment, traveling through the elongated path or groove 72 of the cam 66, will cause said segment to move outwardly, and thus partially rotate the blade 24, which is thus protruded from the cylinder 40, and, bearing against the once-folded sheet, doubles it between the rollers 48 49 and into their nip, which rollers, being driven by gears, one of which meshes with the toothed wheel 59, roll the sheet out between them a second time folded. At the proper time the elongated cam 72 reverses the movement of the blade 24 and carries it into a position to repeat its folding operation. As the twice-folded sheet is carried out between the rollers 48 49 it is projected over an intervening guide into the nip of the rollers 81 82, which, driven by a belt or in any other manner, slowly move the said sheet outwardly and drop it upon a table, as 83.

In performing this last-described folding operation it is apparent that the sheet-controlling cylinder 20 and its devices must be out of operation, and this is accomplished by adjusting the swinging frame 200, in which they are mounted. This frame is pivoted on the rod 63, and when rocked so as to carry the cylinder 20 downward it may be locked in a horizontal position by means of the adjusting-arm 74.

Another part of an edition is delivered to news-agents for counter sale and to carriers for hand distribution, and it is desirable that the product for such distribution shall be folded in a small compass, so as to bring the papers to a suitable size for convenient handling of a considerable quantity. This is accomplished by imparting to the twice-folded sheets a third fold, at a right angle to the preceding folds. This is done by bringing into action the cross-folding mechanism, which is supported by the carriers 50 60.

In order to an understanding of the operation of this cross-folding mechanism, as well as its co-operation with the transverse-folding mechanisms, its construction and operation will be first described, and then its coaction with respect to the transverse-folding mechanisms next explained.

The shaft 51 of the carrier 50 is provided with a single folding-blade, 36, that is rotated by a toothed wheel, 37, that gears with a toothed wheel, 38, on the lower end of the shaft 61 of the carrier 60, which shaft 61 is also provided with a beveled wheel, 90, that is driven by a similar wheel, 89, on the shaft of a toothed wheel, 98, which meshes with an intermediate, 201, that is geared with the toothed wheel 53. The toothed wheel 37 is but half the size of the wheel 38, and therefore makes two turns to each one of said wheel 38. Instead, therefore, of duplicating the folding-blade 36, it is made to turn twice as fast as the carrier 60, so as to co-operate with each of the duplicate folding mechanisms of the latter. Each of these folding mechanisms consists of a jaw, 27, that is fixed upon a shaft that is journaled in the heads of the carrier 60, and provided at the lower end with a rock-arm, the stud or roller 28 upon the end of which travels in a grooved cam, 29, cut in the face of a stationary cam-plate, 75. This jaw is vibrated in one direction at the point where the folding-blade 36 co-operates with it to seize the paper, and it is vibrated in the opposite direction at a proper point after passing the vertical folding-rollers 85 86 to release the sheet. Its co-operating jaw 76 projects from a shaft, 77, that is journaled in the heads of the carrier 60, and provided above the bottom one of said heads with a bell-crank, 78, one arm of which is provided with an opening, 79, through which a removable pin, 87, may be entered, so as to protrude into a cam-plate slot, 88, formed in the face of the cam-plate 75. When this stud 87 is thus placed so as to travel in the cam-slot 88, said cam-slot will cause the jaw 76 to be held in a fixed position for action with the jaw 27 at the time when these jaws are co-operating with the blade 36 to seize the bight of the folded sheet, and this cam-slot 88 will cause said jaw 76 to be vibrated to release said sheet at a proper point in advance of the delivery mechanism for a thrice-folded sheet, as will hereinafter appear, the cam-groove 88 further vibrating said jaw 79 back to its stationary position for co-operation with the jaw 27 before said jaws 76 and 27 again reach the position for coaction with the blade 36.

The delivery mechanism for a thrice-folded sheet is, in part, comprised in a presser-plate, 91, that is attached to a vertical shaft, 92, which is journaled in the heads of the carrier, and provided above the bottom plate thereof with a rock-arm, 92, which rock-arm is connected by a rod, 93, with the other arm of the bell-crank 78, so that when the jaw 76 is vibrated by the cam-groove 88 said bell-crank will impart concerted vibrations to the presser-plate 91, for a purpose yet to be explained.

At a suitable point behind the jaws 76 27 there is provided a vibrating folding-blade, 31, which blade is attached to a vertical shaft, 101, journaled in the head-plates of the carrier 60, and provided at its upper end with an eccentric-disk that travels in the groove 93 of a fixed cam-plate, 94. This blade 31 is thus caused to make a semi-rotation in passing the folding-rollers 85 86, so as to project outwardly, travel over the peripheries of said rollers, and in passing said rollers enter between the same. The remaining part of the delivery mechanism for a thrice-folded sheet consists of a fixed presser-plate, 95, and an elastically-moving or spring-seated presser-plate, 96, which plates are placed at a proper distance in advance of the point where the rotating folding-blade 36 co-operates with the jaws 27 76.

To adjust the mechanisms to impart three folds to the sheet the pin 87 is taken from a second hole, 99, in one arm of the bell-crank 78, where it locks the same to the lower head of the carrier, and consequently holds the jaw 76, and thus prevents both the jaw 76 and the presser-bar 91 from being vibrated. This pin 87 is entered through the hole 79 into engagement with the cam-slot 88, which will cause said jaw 76 and plate 91 to vibrate as the carrier 60 revolves. Both of these positions are shown in Fig. 14. The lever 74 is then operated to raise the swinging frame 200 into its highest position, whereby the folding-rollers 23 62 are brought into operative relation with respect to the folding-blades 24 of the carrier 40. This brings the vertical guides or conductors 6 7, which depend from a point beneath the contact of said folding-rollers and operate to conduct the sheets emerging from said rollers, properly down between the carriers 50 60. The cam 66 is then adjusted axially, and its switch 5 adjusted so as to bring the elongated path of travel of said cam into operation to vibrate the folding-blade 24 at a point to properly coact with said folding-rollers 23 62.

The rollers 48 49, which are hung in a frame pivoted to the side frames, 41 42, are swung up so as to be out of operation and not obstruct the path of movement of the blade 17. When swung up, as in Fig. 1, they are secured in their non-working position by means of spring-bolts at the ends of their frame. When swung down these rollers are brought into working-relation to the carrier 40, and their frame is there secured by the bolts.

The rollers 81 82, which are hung in a frame that swings in bearings on the side frames, are swung down, as in Fig. 1, so that the sheets delivered as folios may pile on top of them or on a board rested upon them. These rollers are swung up to co-operate with the rollers 48 49 in delivering sheets twice folded. The motion of the toothed wheel 98 is then imparted to the shaft 61 by means of a clutch mechanism, so as to rotate the carriers 50 60. The operation will then be as follows: The sheet once folded by the mechanisms, as first hereinbefore described, will be carried around with the cylinder 40 until its central part is over the said folding-rollers 23 62. As this is accomplished the cam 65 72 will rotate the blade 24 to impart a second transverse fold to said sheet by doubling the same into the nip of the rollers 23 62. These rollers will deliver the sheet from between them, and the same will be directed by the conductors 6 7 vertically between the carriers 50 60. As the folding-blade 36 is properly timed in its rotation, it will, when this twice-folded sheet has descended vertically to a proper distance, double the same on a line at right angles to the preceding folds into the space between the jaws 76 27, the latter immediately vibrating to nip the double portion between its face and that of the jaw 76. These jaws carry the sheet onward with the carrier 60, and when they have arrived at a proper point beyond the jaw 95 the cam 88 will simultaneously cause the jaw 76 to vibrate and release the thrice-folded sheet, and the presser-bar 91 to vibrate and press the tails of the same against the elastic jaw 96, thus causing said tails to lap past the jaw 95, and as the presser-blade 91 makes its return vibration within the carrier, and said carrier, moving onward, carries the blade 91 away from the plate 96, said plate 96 is allowed to press forward and nip the tails of the thrice-folded sheet between it and the jaw 95, thus arresting the onward movement of the sheet and holding it stationary. The other sheets thus folded will be pressed against the preceding ones, and a pile will shortly accumulate between the jaws 95 96, from whence they may be removed by hand in quantities, as may be desired.

Another part of a newspaper edition requires to be folded properly for transmission in the mails. This necessitates at least four foldings. That number of folds may be imparted to a sheet in passing once through this machine in the following manner: The pin 87 is removed from the opening 79 in the bell-crank 78, and entered through the opening 99, and into a hole in the lower head of the carrier 60. This locks the jaw 76 and presser-bar 91 out of action, or so that they will not vibrate, as before explained. The sheet folded twice, as before described, and which has received its third fold at a right angle to the previous ones, as just described, is carried by the jaws 27 76 onward with the carrier 60 until the middle portion of the thrice-folded sheet arrives before the folding-rollers 85 86. At this time the vibrating folding-blade 31 acts to double said thrice-folded sheet into the nip of the rollers 85 86, from which it emerges a fourth time folded. The sheet thus folded and delivered may be packed in any suitable manner—such, for instance, as by the mechanisms described in the patent granted to me January 12, 1877, and in part illustrated in this case.

From the foregoing description of the mechanism it will appear that this improved mechanism provides, in a compact machine, all of the devices necessary to accomplish the folding of a sheet of paper into the various forms required in the production of a newspaper, whereby the same is adapted for distribution in various forms. It is to be understood, however, that any one or more of the various combinations of parts may be embodied in a machine, and that such machine may manipulate any fabric, whether printed or not; also, that the folding mechanisms may be used independently of the cutting devices.

The supplement mechanism described in the Patent No. 225,746, granted to me March 23, 1880, may be used in connection with these improvements, whether or not the cutting and folding devices here described are made of a length suitable to operate upon two webs formed by splitting a main web as it passes to them. So, too, turning devices such as are described in Patents No. 181,250, granted August 22, 1866, and No. 214,444, granted February 18, 1879, may be combined with the mechanism herein described.

The folding-blades 24 might, of course, make entire revolutions and still perform their function of folding in connection with the folding-rollers.

What is claimed is—

1. A rotating folding mechanism consisting of the combination, with a pair of folding-rollers, of a rotating carrier that supports a folding-blade, as 24, a pinion, as 25, a vibrating segment-rack, and an actuating-cam, said mechanisms operating the folding-blade and protruding the same for coaction with the folding-rollers, substantially as described.

2. The combination of the folding-blade 24, a cam, and intermediate connecting mechanism for imparting a rotative movement to it, with the swinging frame 200, all substantially as described.

3. The combination of the folding-blade 24, a cam, and intermediate connecting mechanism for imparting a rotative movement to it, with the swinging frame 200 and the cross-folding mechanism, all substantially as described.

4. The combination, with the folding-blade 24, its cam, having paths 65 and 72, and intermediate connecting mechanism, of the switches 5 and the adjusting-lever 73, substantially as described.

5. The combination, with the folding-blade and folding-rollers 28 62 and the cross-folding mechanism, of the pivoted or swinging conductors 6 7, substantially as described.

6. The combination, with the cylinder 40 and the blade 17 it carries, of the cylinder 20 and one or more of its plates 21, with which the said blade co-operates in arresting the sheet, substantially as described.

7. The combination, with the cylinder 40 and the blade 17 it carries, of the cylinder 20, its plate or plates 21, and row or rows of pins 22, substantially as described.

8. The combination, with the cylinder 40 and the recessed blade 17 it carries, of the pins 22, substantially as described.

9. The combination, with the folding-blade 24, of the cam having two paths, as 65 and 72, which are united by a head-switch, 5, and a tail-switch, 4, substantially as described.

10. The combination, with the folding-blade 24 and the adjustable rollers 28 62 and 48 49, of an axially-adjustable cam for actuating said folding-blade, whereby it may be put into operation at either set of rollers, substantially as described.

11. The combination of the folding-blade 24, the swinging rollers 48 49, and the swinging rollers 81 82, substantially as described.

12. The combination of the folding-blade 36, the jaws 76 27, the plate 91, and the plates 95 and 96, the latter being spring-seated or elastic, substantially as described.

13. The combination, with the plate 91, jaws 76 and 27, and plates 95 and 96, of the cam 88 and adjustable pin 87, substantially as described.

14. The combination of the folding-blade 36, jaws 27 76, folding-blade 31, rollers 85 86, cams 88 and 29, and pin 87, substantially as described.

15. The combination, with a rotating carrier, as 40, of a blade, as 24, mounted upon a shaft that is provided with a pinion, a segment-rack, as 26, and a stationary cam, whereby said cam is vibrated, substantially as described.

In testimony whereof I have hereunto set my hand in the presence of two subscribing witnesses.

LUTHER C. CROWELL.

Witnesses:
CHAS. W. CARPENTER,
H. T. MUNSON.